Feb. 13, 1951 R. H. HARTIGAN 2,541,053
CYANOGEN COMPOUNDS
Filed Dec. 29, 1945
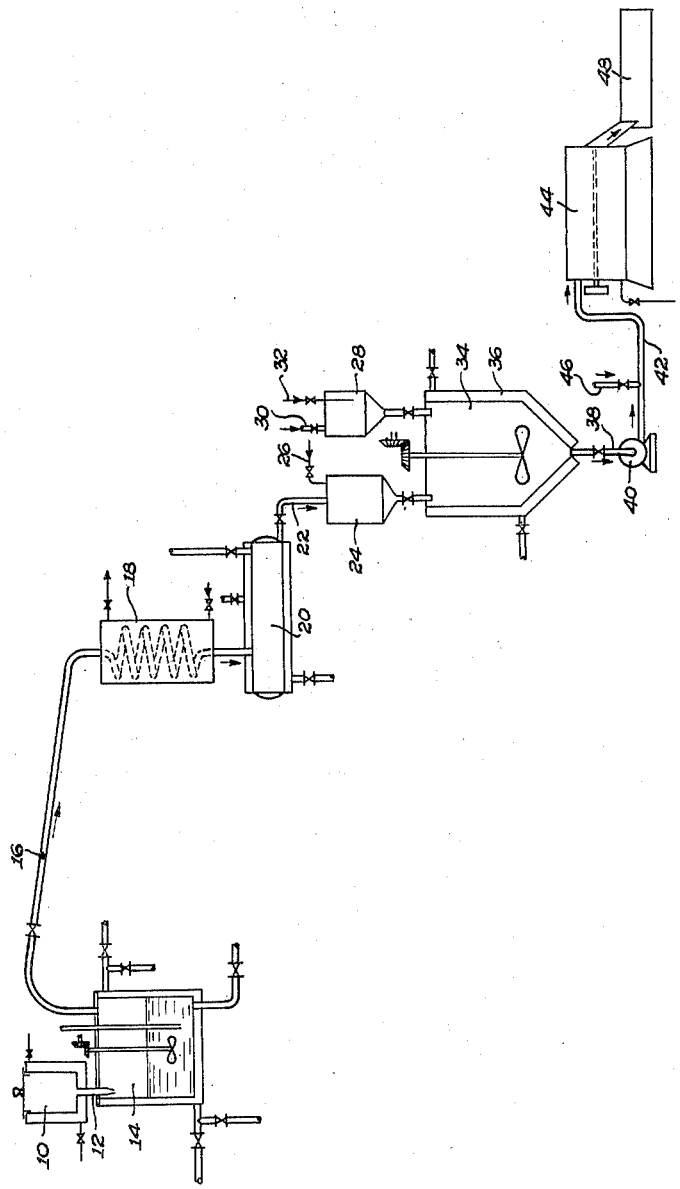
WITNESSES:
INVENTOR
RAYMOND H. HARTIGAN.
BY
his ATTORNEY

UNITED STATES PATENT OFFICE 2,541,053

CYANOGEN COMPOUNDS

Raymond H. Hartigan, Rensselaer, N. Y., assignor to Koppers Company, Inc., Pittsburgh, Pa., a corporation of Delaware Application December 29, 1945, Serial No. 638,399

9 Claims. (Cl. 260—248)

This invention relates to the production of cyanuric halides. More particularly the invention relates to the production of cyanuric halide from cyanogen bromide.

Melamine resins may be made by the amination of cyanuric chloride. Cyanuric chloride may be made by the polymerization of cyanogen chloride. Cyanogen chloride has a melting point of $-16°$ C., a boiling point of $13.8°$ C., and is a gas at normal temperature and pressure. The gas is quite toxic so that the chlorination process is carried out with difficulty in special equipment and at a comparatively high cost.

Cyanogen bromide has a melting point of $52°$ C. and a boiling point of $61.6°$ C. so that it may be handled as a solid. I have found that cyanogen bromide may be efficiently polymerized with a metallic halide catalyst by treatment at temperatures below its boiling point. The cyanogen bromide, as well as the metal halide catalysts (aluminum chloride $AlCl_3$ and aluminum bromide $AlBr_3$) are very soluble in nitroparaffins such as nitromethane, nitroethane, nitropropane and nitrobutane, so that the polymerization of the cyanogen bromide may be carried out in a homogeneous solution. Very important also is the fact that the cyanuric halide product is practically insoluble in nitroparaffin solvent and may be separated therefrom by filtration.

The most common raw materials now being used for the manufacture of cyanogen halides is sodium cyanide. The alkali metal cyanides are formed by the reaction of these metals with charcoal and ammonia. Hydrocyanic acid (HCN) is extracted from coal carbonization gas, such as coke oven, and coal gas. I have found that cyanogen bromide may be made by the direct bromination of HCN, NaCN or $Ca(CN)_2$ according to the formulae

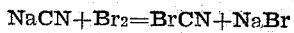
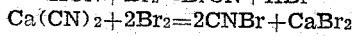

$NaCN+Br_2=BrCN+NaBr$
$HCN+Br_2=BrCN+HBr$
$Ca(CN)_2+2Br_2=2CNBr+CaBr_2$

If a molar equivalent of hydrocyanic acid is directly brominated with elemental bromine, a very strong hydrobromic acid solution is formed which acts to hydrolyze the cyanogen bromide to form ammonium bromide $NH_4Br$ and $CO_2$. This reaction takes place with explosive violence when the concentration of HBr is high. It is important, therefore, that the bromination of hydrocyanic acid should be carried out so as to avoid explosive reactions and a loss of cyanogen constituents.

When the synthesis is carried out between the alkali and alkaline earth metal cyanides with aqueous bromine in the presence of sulphuric acid, ammonium bromide is formed as a hydrolysis product, particularly if strong sulphuric acid is used.

The primary object of the present invention is to provide a process for efficiently producing cyanuric halides.

Another object of the invention is to provide a process of producing cyanogen bromide by the direct bromination of hydrocyanic acid or a metal cyanide with elemental bromine.

A further object of the invention is to provide a process of producing mixed cyanuric halides.

With these and other objects in view the invention consists in the process of producing cyanuric halides hereinafter described and particularly defined in the claims.

Hydrocyanic acid HCN may be recovered from coke oven gas by scrubbing the mixture of gaseous HCN, $CO_2$ and $H_2S$ resulting from the hot vacuum actification process with hot water. In this process as an average a 4% aqueous hydrocyanic acid solution substantially free of $H_2S$ and $CO_2$ may be recovered. The alkali metal cyanides are made in comparatively large quantities and at present are the main raw material from which cyanogen halides are made.

I have found that the HCN may be directly brominated to form cyanogen bromide by the treatment with elemental bromine. This process may be carried out in an apparatus illustrated in the accompanying drawing which is a diagrammatic flow sheet of an apparatus for producing cyanuric halide from hydrocyanic acid.

Referring to the drawing, the hydrocyanic acid is placed in a jacketed container 10 and passes through a dropping stem 12 into a body of bromine and water in a jacketed mixer 14. The hydrocyanic acid is slowly added to the bromine water mixture with constant stirring, while the contents are maintained at a temperature below $23°$ C. to avoid loss of reactants by volatilization and to obtain an efficient precipitation of cyanogen bromide. When the hydrogen cyanide has been admitted the reaction mixture consists of a colorless hydrobromic acid solution containing an abundance of white, crystalline cyanogen bromide in suspension. The cooling solution is withdrawn from the jacket of the mixer 14 and thereafter steam is introduced for heating the solution while stirring the mixture of cyanogen bromide and hydrobromic acid. Thereupon the cyanogen bromide is distilled out of the mixture and passes through a line 16 into a temperature controlled tube 18, then into a cooled jacketed chamber 20, where the cyanogen bromide solidifies.

The cyanogen bromide preferably is polymerized to produce a cyanuric halide by a catalytic polymerization in contact with a metal halide, such as an aluminum chloride or aluminum bromide. Metal halide catalysts are preferably in an anhydrous state and as such may be readily dissolved in a nitroparaffin hydrocarbon solvent such as nitromethane, nitroethane, nitropropane or nitrobutane. These solvents also dissolve the cyanogen bromide so that a homogeneous intimate contact may be obtained between the cyanogen bromide and the catalyst. A further advantage of the solution catalyst is that the reaction product cyanuric halide is practically insoluble in the nitroparaffins. Therefore the cyanuric halides may be precipitated in the catalyst solution and readily separated therefrom by filtration. Furthermore the reaction may be efficiently carried out at atmospheric pressure.

Referring to the drawing the cyanogen bromide is transferred from the chamber 20 through a line 22, which may be a conveyor or a pneumatic tube, into a solution tank 24 where the cyanogen bromide is dissolved in a nitroparaffin, such as nitromethane, introduced through a valved line 26. The catalyst (aluminum chloride) is introduced into a solution tank 28 through a line 30 and brought into solution in nitromethane introduced through a valved line 32. The aluminum chloride solution is introduced into a catalyst converter 34 and into this solution is introduced the solution of cyanogen bromide from the solution tank 24. This process causes an evolution of heat so that cooling must be provided in a jacket 36 to maintain the temperature below 60° C. Preferably the temperature is maintained at about 50° C. for one hour to complete the reaction. After the reaction has been completed cyanuric halide remains in suspension in the solution and this suspension may be withdrawn through a line 38 and forced by means of a pump 40 through a line 42 into a filter press 44. After the precipitated cyanuric halide and its mother solution have been forced into the filter press 44 more nitromethane is introduced through a line 46 to wash mother liquor from the crystalline cyanuric halide. The cyanuric halide then may be forced into receiver 48. The mother solution may then be recycled in the process.

Referring now to the production of cyanogen bromide, it has been found that the hydrocyanic acid may be reacted with elemental bromine in the following proportions:

One mol of bromine (160 grams) is mixed with an appropriate quantity of water and to the mixture is added 1.1 mols of hydrocyanic acid (30 grams). It has been found that different quantities of water may be used for carrying on the reaction in order to provide a smooth reaction which will not entail the loss of bromine or hydrocyanic acid by volatilization, or the loss of cyanogen bromide by hydrolysis. For example with 1 mol of bromine from 570 to 170 ml. of water have been used. Furthermore, in these tests, it has been found equally satisfactory, though less convenient, to distribute the water in any desired proportion between the bromine and the hydrocyanic acid.

For convenience in discussion, it is desirable to consider a so-called percentage equivalent concentration of HCN. The percentage equivalent of HCN charged to the converter may be represented by the formula:

$$\text{Percent equals} \frac{\text{weight of HCN charged}}{\text{weight of charged HCN plus total weight of water}}$$

It has been found that the equivalent concentration of HCN charged has a very definite bearing upon the efficiency of the conversion and the amount of recovery of cyanogen bromide. For example from 5% to 15% equivalent concentration of HCN gave the most efficient recovery. Any attempts to use higher than a 15% equivalent concentration of HCN have been found to cut down the efficiency of conversion and the amount of cyanogen bromide recovered.

With a 5% equivalent concentration of HCN charged the percentage of cyanogen bromide collected was approximately 95%. With 10% equivalent concentration of HCN charged the yield of cyanogen bromide was approximately 95%. With 15% equivalent concentration of HCN charged the yield of cyanogen bromide was approximately 93%. With 5% HCN equivalent concentration the purity of the cyanogen bromide averages about 87%, whereas with the 15% charge of HCN the purity of the cyanogen bromide isolated was 93% to 96%. If the product obtained when using a 15% concentration of HCN is distilled in the presence of a dehydrating agent, a product of 98% cyanogen bromide content may be obtained. As the percentage concentration of HCN was increased above 15% the percentage yield of cyanogen bromide fell off rapidly and the production of ammonium bromide increased. Furthermore, from 1% to 4% of cyanogen bromide is recoverable from the distillation residue of the bromination reaction.

As the result of a large number of tests it has been found that when 11 parts of cyanogen bromide are polymerized with 1 part of aluminum chloride about 8 parts of cyanuric halide are formed. It has also been found that a small amount of hydrochloric acid may be used as a promoter although the yield of cyanuric halide produced when using the promoter is no larger than when a promoter is not used. The nitromethane for dissolving the aluminum chloride and cyanogen bromide is preferably in the anhydrous state. Approximately 75 ml. of nitromethane are used in dissolving five grams of aluminum chloride. These same amounts of catalyst and solvent, furthermore, will dissolve and form a complex solution with 55 grams of cyanogen bromide. It has been found that as the number of parts of aluminum chloride per part of cyanogen bromide is increased the amount of chlorine in the cyanuric halide increases. The average yield when using different amounts of aluminum chloride will vary from 65% to 75% but the proportion of 11 parts of cyanogen bromide to 1 part of aluminum chloride appears to give the maximum yield and purity of cyanuric halide.

The analysis of the cyanuric halide produced by the present invention shows a formula of $$-C_3N_3Br_xCl_{(3-x)}$$ 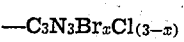

In this halide, therefore, we may have compounds in which three bromine atoms are included in the cyanuric ring or three chloride atoms may be attached in the cyanuric ring. In addition we may have compounds having two bromine atoms and one chlorine atom in the cyanuric ring, or two chlorine atoms and one bromine atom in the cyanuric ring. If the aluminum bromide is used as the catalyst the polymerization product will be cyanuric tribromide. With the preferred process using 11 parts of cyanogen bromide with 1 part of aluminum chloride the cyanuric halide contains approximately 85% bromine atoms and 15% of chlorine atoms attached to the cyanuric ring.

One advantageous feature of the present invention is that the cyanuric halides, such as described above, are practically insoluble in the nitroparaffins so that when the polymerization is completed the cyanuric halides are precipitated in the reaction liquid and may be readily filtered therefrom and easily washed free of the mother liquor with the nitroparaffins. It has been found, furthermore, that the cyanuric halide as produced by the present process is 98% to 100% pure.

If it is desired to produce cyanogen bromide from sodium cyanide the same equipment may be employed as when hydrocyanic acid is used. To produce cyanogen bromide from sodium cyanide the raw materials may be used in the following proportions:

One mol of bromine is added to 125 ml. of 2N-sulphuric acid solution which is placed within the mixer 14. The bromine mixture is cooled and to it is added 55 grams of sodium cyanide dissolved in 125 ml. of water. The sodium cyanide is placed in the solution tank 10 and slowly added through the dropper 12. The reaction is controlled by the cooling solution in the jacket of the mixer 14 so that the temperature does not rise about 23° C. In this reaction a clear solution of sodium bromide is formed in which is precipitated white crystalline cyanogen bromide. After the reaction has been completed the cyanogen bromide may be distilled out of the reaction chamber 14 to recover the crystalline cyanogen bromide in the chamber 20. Using the proportions outlined above 96% of the theoretical yield of cyanogen bromide having a purity of approximately 95% may be recovered. Furthermore, the reaction proceeds smoothly and safely. Also there is a minimum of hydrolysis of the cyanogen bromide to form ammonium bromide.

The cyanogen bromide which is formed either from hydrocyanic acid or sodium cyanide may be effectively polymerized by the process outlined above. The loss of cyanogen bromide to ammonium bromide varies directly with the concentration of the byproduct hydrobromic acid and with the proportions recited in the above examples the loss of cyanogen bromide may be held at a minimum.

The preferred form of the invention having been thus described what is claimed as new is:

1. A process of producing cyanuric halide comprising: thoroughly mixing a nitroparaffin solution of a metal halide with cyanogen bromide while preventing the temperature from rising above 60° C. until the exothermic reaction is completed to obtain a yield of cyanuric halide above 60% of theoretical and separating the precipitated cyanuric halide from the reaction products.

2. The process described in claim 1 which is carried out at atmospheric pressure.

3. A process of polymerizing cyanogen bromide to form a cyanuric mixed halide comprising contacting the cyanogen bromide with a nitroparaffin solution of aluminum chloride at a temperature of 40° to 60° C. to polymerize the cyanogen bromide and combine chlorine of the catalyst in the cyanuric ring to obtain a yield of cyanuric halide above 60% of theoretical and separating the precipitated cyanuric halide from the reaction products.

4. The process defined in claim 1 in which the cyanuric halide is separated from the reaction solution by filtration.

5. The process defined in claim 1 in which the catalyst solvent is nitromethane.

6. The process defined in claim 1 in which the catalyst is aluminum chloride and is present in the reaction mixture to the extent of about 9% of the cyanogen bromide being polymerized.

7. The process defined in claim 1 in which the catalyst is aluminum bromide.

8. The process defined in claim 1 in which the catalyst solvent is a nitrocompound of paraffin hydrocarbons having $C_1$ to $C_4$ carbon atoms to the molecule.

9. The process defined in claim 4 in which 11 parts of cyanogen bromide is polymerized with 1 part of aluminum chloride to produce approximately 8 parts of cyanuric halide.

RAYMOND H. HARTIGAN.

REFERENCES CITED

The following references are of record in the file of this patent:

UNITED STATES PATENTS

| Number | Name | Date |
|---|---|---|
| 666,135 | Goepner | Jan. 15, 1901 |
| 1,588,731 | Henser | June 15, 1926 |
| 2,414,655 | Metcalfe | Jan. 21, 1947 |
| 2,416,656 | Thurston | Feb. 25, 1947 |

OTHER REFERENCES

J. Am. Chem. Soc., vol. 41, part 2 (1919) pp. 1241–1248.

In re Migridichian, 1942 C. D. 554–556, or 544 O. G. 458–459.

Certificate of Correction

Patent No. 2,541,053 February 13, 1951

RAYMOND H. HARTIGAN

It is hereby certified that error appears in the printed specification of the above numbered patent requiring correction as follows:

Column 5, line 35, for the word "about" read *above*;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*